July 4, 1939.    J. G. PROSSER    2,164,624
APPARATUS FOR MOLDING CONCRETE PIPE
Filed Dec. 28, 1936    2 Sheets-Sheet 1

INVENTOR.
Joseph G. Prosser
BY Lyon & Lyon
ATTORNEYS

July 4, 1939.   J. G. PROSSER   2,164,624
APPARATUS FOR MOLDING CONCRETE PIPE
Filed Dec. 28, 1936   2 Sheets-Sheet 2
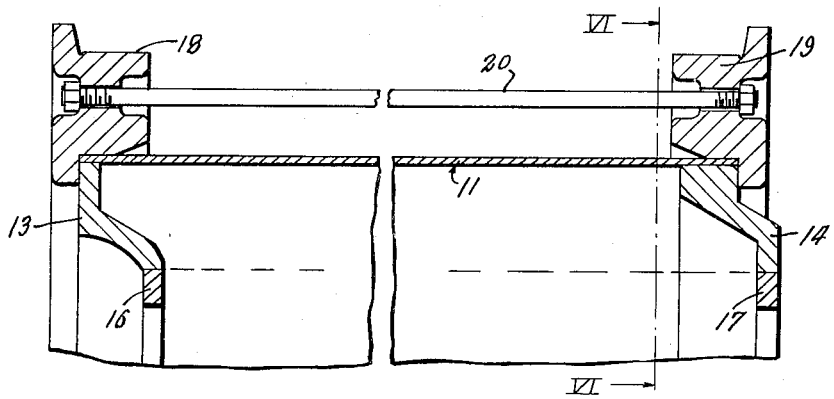
Fig. 4.
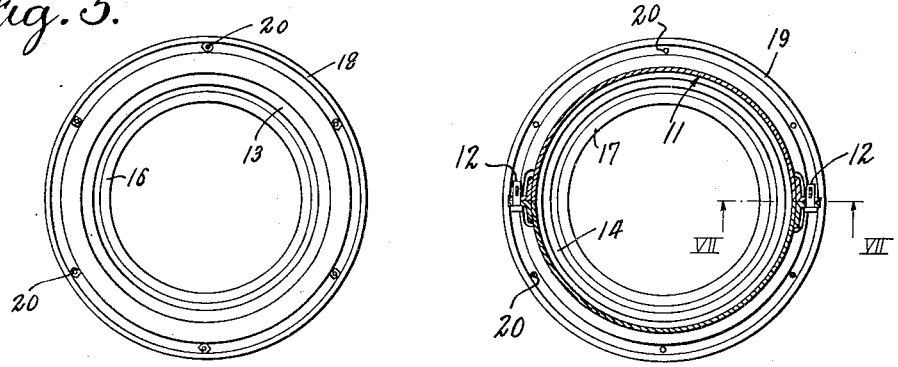
Fig. 5.
Fig. 6.
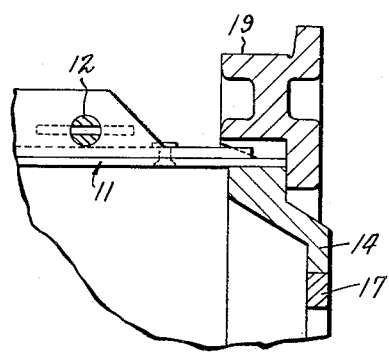
Fig. 7.
INVENTOR.
Joseph G. Prosser
BY Lyon & Lyon
ATTORNEYS Patented July 4, 1939

2,164,624

UNITED STATES PATENT OFFICE 2,164,624

APPARATUS FOR MOLDING CONCRETE PIPE

Joseph G. Prosser, Onekama, Mich.

Application December 28, 1936, Serial No. 117,733

3 Claims. (Cl. 25—30)

This invention relates to a method and apparatus for molding products and is of particular value in molding concrete products, such as concrete pipe.

The invention relates to a process and apparatus of the type in which centrifugal force is employed to distribute, shape and consolidate the material to be molded into a cylindrical or like body.

Heretofore, concrete pipes, conduits, and the like, have been molded by the use of a cylindrical mold formed of resilient or hinged material, which molds are rotated in operation upon a series of rotatably mounted rollers contacting the cylindrical mold or ring or flange thereon. The power for rotating the cylindrical mold may either be supplied to the mold or to the rollers, which are permitted to frictionally drive the mold.

Such methods and apparatus have the disadvantage that in operation as the material to be molded, for example concrete, is fed into the mold, the mold has a tendency to rise up and jar against one of the supporting rollers, thus interfering with the centrifugal forces acting to consolidate the material to be molded, with the resulting disadvantage that a considerable percentage of the product may be weakened in the operation, and, further, the apparatus offers some hazard to the operators. Furthermore, with the methods and apparatus heretofore in use, when it is desired to change the diameter of the molded object to be produced, adjustments in the spacing of the supporting rollers are required.

The present invention has for its general object to provide a method and apparatus for molding material, such as concrete, into cylindrical bodies, which method and apparatus is so designed as to prevent the undesirable jarring of the mold while it is being spun, thus insuring against interference with the centrifugal forces acting on the material and resulting in a marked lowering in the percentage of the product which is spoiled in operation.

A further object of the present invention is to provide a method and apparatus for molding concrete which will better insure the safety of the operators.

A further object of the present invention is to eliminate the necessity of making changes in the supporting rollers upon a change in the diameter of the product to be molded.

A further object of the present invention is to reduce the amount of power required in the process.

In accordance with the present invention, the molding apparatus includes a receptacle, such as a drum, which may be mounted upon rollers or otherwise driven so as to provide a continuously moving concave surface. Upon such continuously moving surface there is placed in a freely floating condition a mold, which is thereby rotated by the continuously moving surface but is free to travel slightly up the side of said moving surface without in any manner jarring the material to be molded whenever there is any tendency in the feeding of the mold to jar.

By this method and apparatus for molding objects, I have succeeded in eliminating the undesirable jarring of the mold while the same is being spun, thus markedly decreasing the percentage of the product which is spoiled in the manufacture. Moreover, the revolving surface drum in which the mold is floating acts as a guard to insure the safety of the operator. It is likewise apparent that any number of different molds of varying sizes may be readily substituted in the method and apparatus without requiring any change in the spacing of the rollers upon which the drum or other moving surface is mounted. It is further found that less power is required in the molding operation than with the machines now in use.

Various further objects and advantages of the invention will be apparent from a description of a preferred form or example of a method and apparatus for molding pipe embodying the invention, and for this purpose I have hereinafter described one form or example of such an apparatus and process. The description is given in connection with the accompanying drawings, in which—

Figure 4 is an enlarged fragmentary section, taken longitudinally through one of the molds of the apparatus.

Figure 5 is an end view of the mold.

Figure 6 is a section on the line 6—6 of Figure 4.

Figure 7 is a fragmentary section along the line 7—7 of Figure 6.

Figure 1:
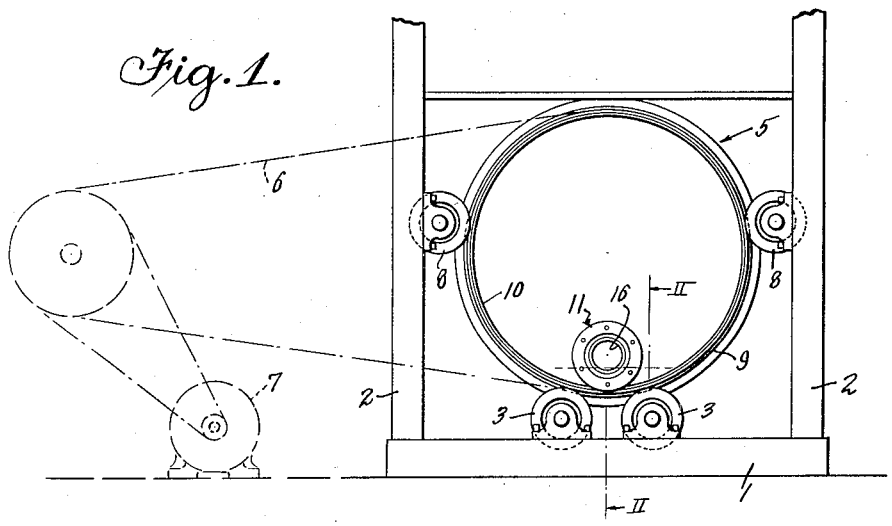
Figure 1 is an elevation.

Referring to the drawings, I indicates a base frame member, and 2—2 are two vertical frame members supported thereby. Upon the base member I are mounted rollers 3—3 of any usual or desired construction, preferably, however, having flanges 4 at their edges. Rotatably mounted upon the rollers 3—3 is a drum 5 or other member capable of providing a concave movable surface. The drum 5 is rotated on the rollers 3 by any suitable means, and for this purpose, as diagrammatically indicated, the same is being driven by a belt 6, which in turn is driven from a motor 7. At the sides of the drum 5 and mounted on the frame members 2 are mounted rollers 8—8 which normally are spaced slightly from the surface of the drum and serve mainly as safety factors in operation. The drum 5 is preferably provided with rings 9 engaging the rollers 3 and adapted to be held between the flanges 4 of said rollers. The drum 5 is also indicated as provided at its ends with rings 10, which form wear surfaces upon which the ends of the mold or molds used in the apparatus may run in operation.

Figure 3:
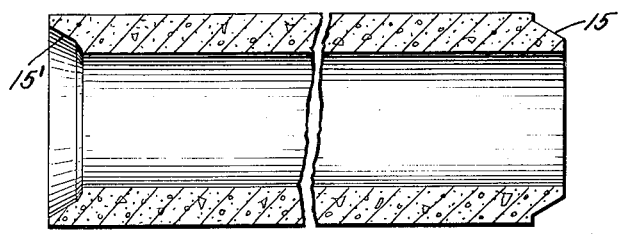
Figure 3 is a section through a molded concrete pipe, such as may be produced by the method and apparatus.

The particular mold illustrated is of a preferred type and is shown as comprising a split shell 11, the shell being provided with flanges receiving bolts or pins 12 for holding the same in position in operation. At the ends of the shell 11 are provided retaining rings 13 and 14 which, where it is desired to mold a concrete pipe one end having a spigot 15 and the other a socket 15' as illustrated in Figure 3, are suitably shaped for the formation of the ends of the product to be so molded. There are also provided detachable rings 16 and 17 on the retaining rings 13 and 14 which increase the depth of the retaining rings sufficiently to initially retain the surplus water present in the concrete to be molded. Thus, rings 16 and 17 may be readily removed from the mold in operation so as to discharge such surplus water near the conclusion of the molding operations.

The mold is further provided with retaining and running flanges 18 and 19 held to the mold by suitable means, such as the bolts 20. These retaining and running flanges are adapted to interlock over the ends of the wear rings 10 on the drum 5 and provide a wearing or running surface for the mold to contact the wear surfaces 10 of the drum.

Figure 2:
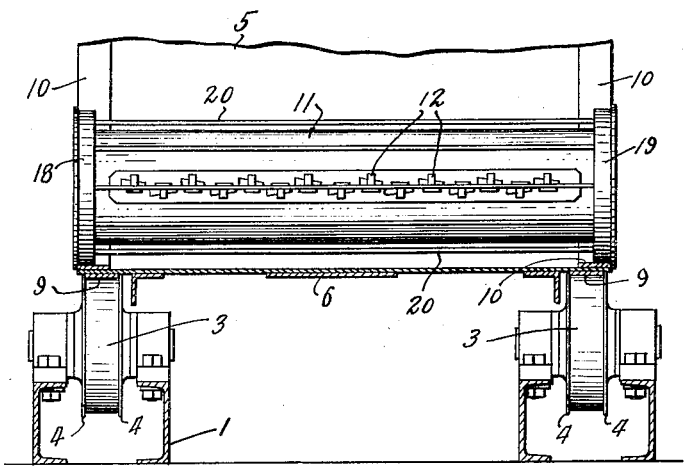
Figure 2 is an enlarged fragmentary elevation partially in section at right angles to Figure 1.

In the operation of the method and apparatus of the present invention the mold is placed within the drum 5, as illustrated, for example, in Figures 1 and 2 of the drawings, and the drum 5 then rotated at suitable speed. This causes the mold likewise to rotate in operation. The mold is thus freely floating upon the moving concave surface provided by the drum 5, and in normal operation seeks the lower portion of the drum 5, as illustrated in Figure 1. After starting the rotation of the drum 5, the mold concrete or other material to be molded is fed into the drum until sufficient material has been deposited therein so as to fill the mold to the line indicated by the retaining rings 16 and 17, it being understood that in such operations the concrete is by centrifugal force distributed and held against the inner face of the shell 11 of the mold. During this feeding operation, if the feeding is too rapid there will be a tendency to stop the rotation of the mold, which will cause the mold to tend to rise along one side of the drum 5. However, this tendency does not cause the jarring of the mold against any surface, as in the usual practice, and the mold will rapidly settle down to smooth continuous operation. After the mold has been filled, it is spun to consolidate the material, and at a suitable time the retaining rings 16 and 17 are knocked from the mold to discharge the surplus water.

It is obvious that by mere lifting of the mold from the drum another mold of different diameter may be substituted therefor, readily permitting the formation of larger diameter conduits or conduits of different end shapes, as desired.

While the particular form of the method and apparatus for molding bodies herein described is well adapted to carry out the objects of the invention, it is to be understood that various modifications and changes may be made, and such modifications and changes are included within the appended claims.

I claim:

1. An apparatus for molding concrete pipe, including a cylindrical molding casing, a drum of considerably larger diameter than said molding casing, means for mounting and driving said drum, rings at the end of said molding casing supporting the molding casing freely within said drum and provided with retaining flanges engaging said drum to inhibit longitudinal movement between said drum and molding casing, whereby the molding casing is frictionally rotated by the contact between said rings and molding drum.

2. An apparatus for molding concrete pipe, including a cylindrical molding casing, end rings shouldered against the ends of said molding casing having retaining flanges, a drum of considerably larger inner diameter than the diameter of said rings, said molding casing being disposed within said drum with said end rings providing for supporting contact between the molding casing and drum with said flanges engaging said drum to inhibit relative endwise movement therebetween, whereby the molding casing is frictionally driven by the rotation of said drum about the axis of said molding casing while adapted to absorb jars by slight planetary movement relative to the inner drum surface, and means for revolving the drum about its axis.

3. An apparatus for molding concrete pipe, comprising a drum and suitable means for revolving the drum with its axis horizontal, a cylindrical molding casing considerably smaller in diameter than said drum and resting therewithin free to be frictionally driven thereby, said molding casing having ring members shouldered against the ends thereof constituting the frictional driving contacts between the drum and molding casing, said rings having means engaging said drum for restraining endwise movement between the drum and molding casing.

JOSEPH G. PROSSER.